Dec. 25, 1962 G. R. HEIDLER 3,070,729

MODULARIZED ELECTRICAL NETWORK ASSEMBLY

Filed March 30, 1960 2 Sheets-Sheet 1

INVENTOR.
Glen R. Heidler

BY H. Walter ...

AGENT

INVENTOR.
Glen R. Heidler

BY
[signature]
AGENT 3,070,729

MODULARIZED ELECTRICAL NETWORK ASSEMBLY

Glen R. Heidler, Paoli, Pa., assignor to Burroughs Corporation, Detroit, Mich., a corporation of Michigan Filed Mar. 30, 1960, Ser. No. 18,537
9 Claims. (Cl. 317—100)

The invention hereinafter described and claimed has to do with electrical network assemblies, and more particularly to the high density modular packaging of such networks in miniature assemblies. With still more particularity the invention relates to a modified form of the invention described and claimed in the co-pending patent application of Edgar O. Sprude entitled "Modularized Electrical Network Assembly," filed December 18, 1959, Serial No. 860,602, for use in network assemblies such as shown in applicant's co-pending application entitled "Housing For Packaging Miniaturized Modular Electrical Network Assemblies," Serial No. 862,596, filed December 29, 1959, both of which applications are assigned to the same assignee as the present invention.

High density packaging of electronic systems is being achieved, in part, by the development of small components, such as, transistors, diodes, capacitors, etc. However, such components in themselves do not meet complete miniaturization system requirements. A definite problem resides in undesirable heat transfer among components, and this problem must be solved in parallel with the development of such components.

The fact that components can be made physically smaller does not imply that the power necessary for proper circuit operation would become proportionately less. Except for the change in energy used by line inductance and stray capacitance, the required power input in a given circuit is unchanged as long as signal and impedance levels remain unchanged. Therefore, dissipation of the heat resulting from the operation of these miniaturized networks is a very real problem. Then too, as the total packaging volume is decreased in the designing of such miniaturized assemblies, the available surface area for the dissipation of the heat is decreased, thus making the solving of this problem more difficult. Another important consideration in the fabrication of such miniaturized assemblies is the difficulty in manufacturing them without high cost and the sacrifice of reliability.

Therefore, an important object of the present invention is to provide an improved modular electrical network assembly of miniature size which overcomes the above-mentioned disadvantages by providing a construction affording rapid dissipation of the heat resulting from energization of the assembly.

Another object of the invention is to provide such an assembly which is substantially immune to thermal and physical shock, and to other environmental conditions.

It is also an important object of the invention to provide a unique miniaturized electrical system sub-assembly unit having extremely low volume and high density of electrical components.

Another object is to provide a unitized modular construction for electrical networks which reduces the technical level required of assembly and maintenance personnel.

More specifically, it is an object of the present invention to provide such a miniaturized modular electrical network assembly which is characterized by its simplicity of design, its rugged construction, and its ease of assembly and maintenance.

In accordance with the above objects and first briefly described, the present invention comprises a miniaturized modular electrical network or system assembly consisting of a plurality of triangularly-shaped miniature circuit sub-assemblies, or module units, assembled around a heat exchanger and enclosed in a housing providing means for easily interconnecting the sub-assemblies into an electrical network assembly, the leads of which are connected to terminals on the exterior of the assembly in position for connection to associated apparatus. The terminals for the leads preferably are of the pin type and positioned at one end of the assembly for plugging the assembly into a socket connector.

More particularly the circuit sub-assemblies are arranged in stacked relation one upon the other, and a plurality of such stacks are arranged radially around a unique heat exchanger including fins separating the stacks one from another and providing means for circulating a cooling fluid adjacent each of the sub-assemblies thus to remove the heat from the assembly when it is energized.

A more complete understanding of the invention may be had from the following detailed description and by reference to the accompanying drawings in which.

Figures 1, 2:
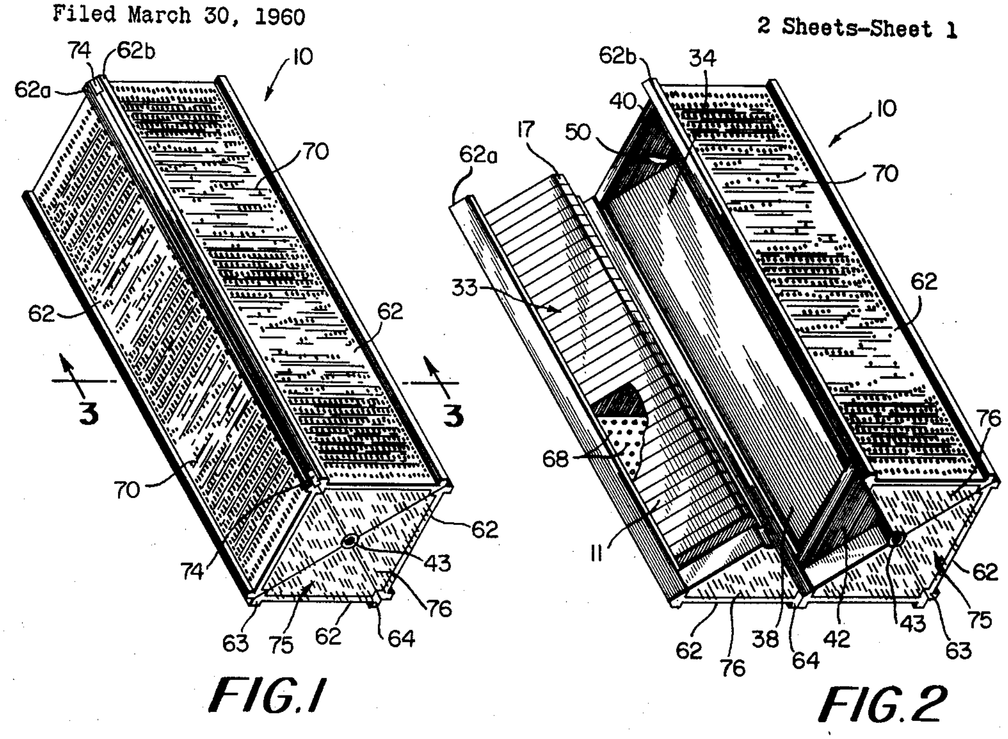
FIG. 1 is a perspective view of a miniaturized modular network assembly constructed in accordance with the present invention.
FIG. 2 is a perspective view similar to FIG. 1 but with the assembly partially opened, or unfolded, to show a portion of its interior.
Figure 4:
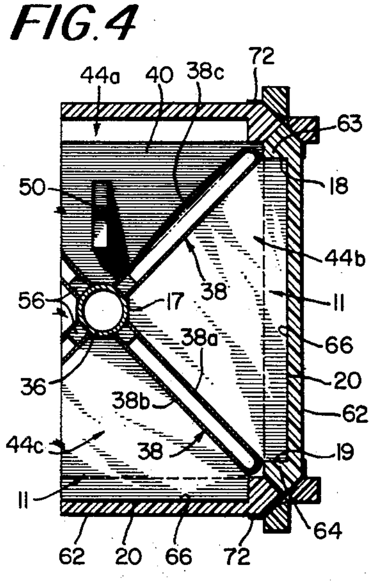
FIG. 4 is a fragmentary sectional view similar to FIG. 3 but with a portion removed to show other features of the invention.
Figure 5:
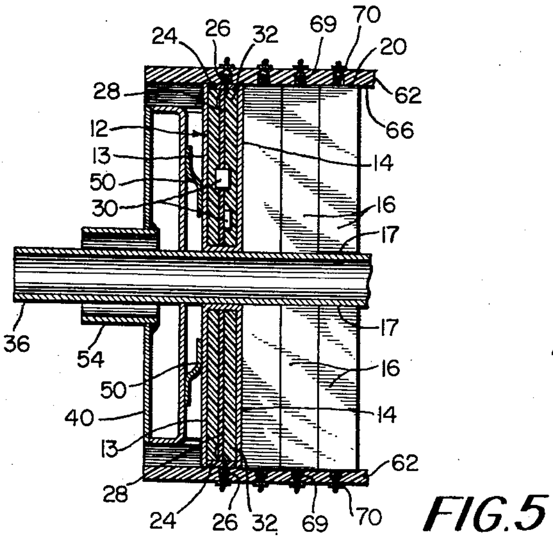
FIG. 5 is a fragmentary sectional view taken along the line 5—5 of FIG. 3.

Broadly, the preferred form of the invention herein illustrated and described in detail comprises a modular electrical network or system assembly (FIG. 1) including a plurality of sub-assemblies (FIGS. 2 through 5). As shown more clearly in the Sprude application mentioned above, each sub-assembly comprising a separate circuit constructed essentially as a flat wafer, or chip, preferably of substantially triangular shape, with exposed connector leads or pins extending from its bottom or base edge portion (FIG. 5). The chips are stacked together in four stacks radially arranged around a novel heat exchanger having a centrally positioned tubular portion and hollow fins extending between and dividing the stacks from each other. This assembly is then placed in a housing with the exposed leads of the chips plugged through substantially planar housing walls and into electrically conductive relation with electrical conductors preferably printed on the exterior surfaces of the walls (FIGS. 1 and 2). The assembly is of square cross-section and may be of any desired length, thus to form an electronic system or miniature modularized electrical network assembly having three major dimensions.

All of the components are hermetically sealed on the inside of the assembly while all of the interconnections between the sub-assembly units, or chips, are on the walls of the housing, preferably the outside surfaces. A suitable cooling fluid from an exterior source is circulated through the tube and the hollow fins of the heat exchanger thus to remove the heat resulting from energization of the assembled system network.

Some of the printed circuit conductors on the exterior faces of adjacent housing walls may be interconnected by resilient or flexible conductors while others terminate at pin type terminals positioned at one end of the assembly for plug-in connection to associated apparatus. The flexible conductors may take any suitable form but it is preferred to form them in accordance with those described and claimed in the co-pending application of Glen R. Heidler, entitled "Hinge Structure," Serial No. 860,449, filed December 18, 1959, and assigned to the same assignee as the present invention.

To afford some idea of the compactness of this miniaturized assembly, it is of interest that a module constructed in accordance with this invention is capable of containing—in round figures—approximately 9000 components of the kind mentioned above, in a housing having the dimensions of 2.125" x 2.125" x 6.0".

Now more specifically, and with reference to the details of the drawings, it is seen that FIG. 1 illustrates a complete modular network assembly constructed in accordance with the invention. However, for a clearer understanding of the details of this preferred form of the invention, the following description will begin with the smallest unit, the module wafer or chip 11, seen in FIGS. 2 through 5, and, except for certain minor differences, constructed as described in the aforesaid Sprude application. Generally, however, the unit comprises a thin-walled substantially triangularly shaped housing or envelope 12 (FIG. 5) of suitable, preferably of high heat conductive material, such as metal, and including closely spaced opposite walls 13 and 14, bridged along two sides by flat end walls 16.

Each housing is truncated at its apex 17 and at the opposite ends 18 and 19 of its base 20 for the purpose more fully explained hereinafter. The bottom or base side 20 of the housing is closed by a terminal board 24 having electrically conductive pins 26 extending therethrough from its inner side to project from its outer side and provide the input and output terminals for the circuitry carried by a panel 28 within the housing.

Panel 28 is formed of electrically insulating material and in substantially the same size and triangular shape as housing 12. Circuit wires on the panel preferably are of the printed type and provide the means for interconnecting the components 30 which may be supported on either or both sides of the panel, or in the plane of the panel through apertures provided therein. Certain of the printed conductors terminate along the bottom edge of panel 28 and are interconnected with certain of the pins 26.

In the manufacture of the chips the printed circuit panel 28 is fabricated with its printed wiring interconnecting the components mounted thereon, and then is assembled with the terminal board 24. It will be understood that the components carried on the printed circuit panel 28 may be naked transistors, diodes, capacitors, resisters, etc. and may be of the leadless type in which case suitable leads are provided for connecting the components in circuit and to the terminal pins 26. Alternatively the components may be of the type normally provided with lead wires for connection to printed circuitry on the panel 28. The assembled panel is then inserted in the housing and while it is not considered absolutely necessary, it is desirable to hermetically seal the printed circuit panel with its connectors and components within the housing, and to this end the housing is substantially filled with a suitable heat transmitting fluid potting compound 32 such as epoxy resin.

While the particular circuit within the chips is not important to an understanding of the invention, the circuit shown in FIG. 13 of a co-pending application in the name of Stanley Schneider entitled "Modularized Electrical Network Assembly," filed June 8, 1959, Serial No. 818,648, and assigned to the same assignee as the present invention, may be referred to as being exemplary of a typical flip-flop circuit the components of which may be packaged in the chip. The connector pins 26 on the terminal board 24 serve all input and output functions of the chip, and make it a plug-in unit.

In FIGS. 1 through 5, it can be seen how a plurality of the above-described chips are used to form a modular network assembly which may, for example, comprise a complete "arithmetic register" for a computer including a series of flip-flop and diode logic circuits, each comprising one of the above-described chips.

Figure 7:
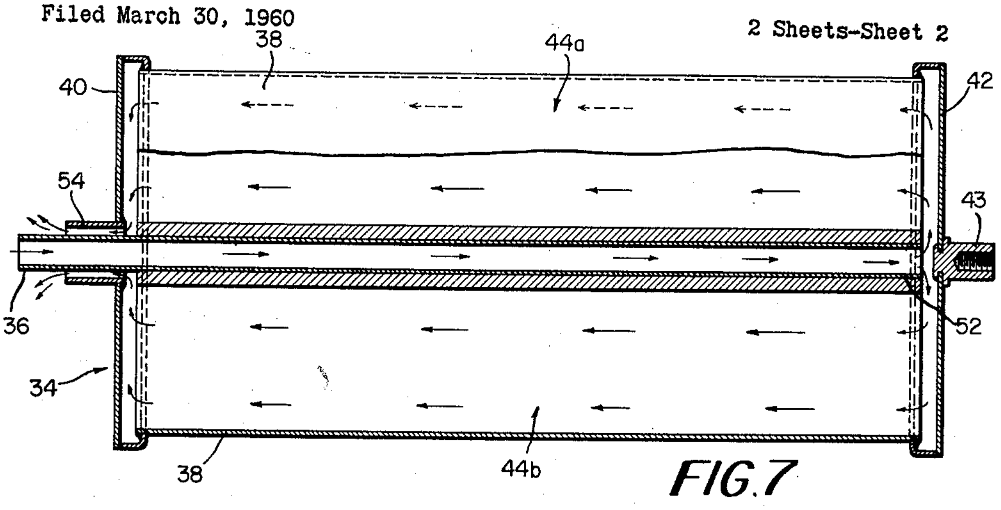
FIG. 7 is an enlarged elevational view of the heat exchanger shown in FIG. 6, but with parts broken away to show the circulatory path of cooling fluid through the heat exchanger.
Figure 6:
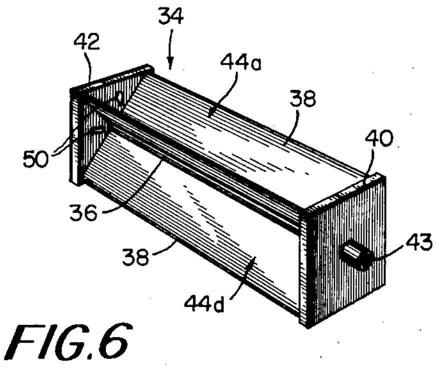
FIG. 6 is a perspective view of the heat exchanger of the invention removed from the assembly.

In particular accordance with this invention and referring now to FIGS. 2 through 5, it is seen that in the completed assembly chips 11 are arranged together with opposing metallic side walls 13 and 14 in face to face contact to form an elongated triangular stack 33, one of which is seen more clearly in FIG. 2. An important feature of the invention is the radial arrangement of four of these stacks around a unique heat exchanger 34 including in this form of the invention, as seen in FIGS. 6 and 7, a tubular member 36, a plurality of radially and axially extending thin walled hollow fins 38 extending between and separating the chip stacks, and hollow walls 40 and 42 forming manifolds or plenum chambers at the opposite ends of the heat exchanger. A screw threaded boss 43 is fixed to the end wall of chamber 42 and provides the means for connecting the assembly to associated apparatus in accordance with applicant's copending application Serial No. 862,596, above mentioned. The fins 38 in this preferred embodiment are arranged 90° apart to form four troughs *44a*, *b*, *c* and *d* (FIG. 3) one for each of the chip stacks which are received therein with the truncated apex 17 of the chips in contact with the outer surface of the tube 36 and their flat edges 16 against the walls *38a* and *38b* of the fins.

As seen in FIG. 5, the chip stacks do not completely fill the troughs 44 from end to end, there being space provided adjacent chamber 40 to provide means in the form of a spring leaf 50 to bias the chips in each stack in tight face to face contact and the whole stack against chamber 42 for good heat conducting relationship.

Referring to FIG. 7, it is seen that the right end 52 of heat exchanger tube 36 is in open communication with chamber 42 which in turn is in open communication with the interior of the hollow fins 38 at their right hand end. The left hand ends of the fins openly communicate with chamber 40 which outlets through a tube 54 of larger diameter and surrounding the left end of tube 36. While the inner ends of the thin flexible walls *38a* and *38b* of the fins may be directly secured to the tube 36 it has been found more convenient to first secure to the tube as by welding or other suitable means, four metallic strips 56 (FIG. 3) and then weld or otherwise secure the inner ends of the walls of the strips.

In assembling the module in accordance with the preferred embodiment, the chips are first arranged in four individual stacks 33, see FIG. 2, each stack along a substantially planar backplane member 62 each forming a side wall of the module 10 when completely assembled, as shown in FIG. 1. Referring again to FIGS. 3 and 4, it will be seen that each of the wall members 62 is provided with upstanding wall portions 63 and 64 on opposite edges of its inner surface 66 (FIG. 3), and which extend throughout the length of the panel (FIG. 2). Between the edge walls 63 and 64 each wall member 62 is provided with a plurality of apertures 68 aligned transversely thereacross from side to side for receiving the pins 26 of the chips. The outer surface of each wall, as seen in FIG. 1, carries the printed circuitry 70 for the purpose of interconnecting the chips in the manner now to be described.

Each of the chips is plugged into its associated wall member 62 by inserting the terminal pins 26 in the apertures 68 until the chip is snug against the inner surface 66 of the wall, and with its ends 18 and 19 abutting the inner surface of the edge walls 63 and 64 respectively. The terminal pins 26 may be of sufficient length to extend through the wall members to be interconnected with selected portions of the printed wiring on the outer surface of the walls—by dip soldering, if desired—and thereby electrically connect the various chips in the desired circuit.

Alternatively the apertures 68 may be provided with connector means 69 of conventional design for receiving and interconnecting pins 26 with the desired circuitry on the associated wall member. Preferably, however, such connectors will be in accordance with that described and claimed in the co-pending application of Stanley Schneider entitled, "Electrical Connector," Serial No. 5,503, filed January 29, 1960, and assigned to the assignee of the present invention.

Figure 3:
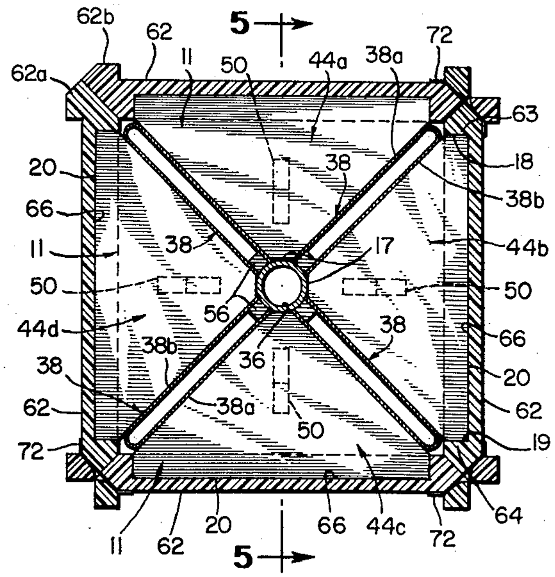
FIG. 3 is a sectional view through the assembly taken along the line 3—3 of FIG. 1.

Interconnection of the electrical conductors on different walls 62 may be accomplished in any suitable manner, but it is preferred to do this in accordance with the method described and claimed in applicant's co-pending application entitled "Hinge Structure," filed December 18, 1959, Serial No. 860,449, and assigned to the same assignee as the present invention, that is, by utilizing the electrically conductive elements 72 which also serve to hinge the panels together, as seen in FIGS. 3 and 4.

After the chips are stacked on walls 62, the heat exchanger is assembled with one of the panels by placing it over one of the stacks with trough 44*a* aligned therewith and then pressing it downwardly until the chips rest snugly within the trough.

With the heat exchanger so aligned on one wall 62, it is then necessary only to fold the walls about their interconnecting hinges 72, from right to left as shown here, whereby the chip stacks are successively received within the successive troughs, as shown in FIG. 2, illustrating the assembly prior to the last folding of a wall. As the final step after the last wall member 62 is folded into place, as shown in FIGS. 1 and 3, the outside edges 62*a* and 62*b* of the adjacent end walls are releasably secured together in a suitable manner, such as by the latch element 74, shown in FIG. 1, thus to enclose the chip assemblies and the heat exchanger in a housing formed by the walls 62.

While the heat exchanger provides other assets, such as a strengthening backbone for the assembly, its primary purpose is to dissipate the heat generated during the time the assembled network is energized. During operation of the assembly a cooling fluid, such as a cool gas, is circulated through the heat exchanger under pressure, see FIG. 7, by way of tube 36, chamber 42, fins 38, chamber 40 and tube 54, thus to remove the heat generated in the chips. The fluid is under sufficient pressure to expand the fins tightly against the chips, as illustrated at 38*c* in FIG. 4—the chip stack normally within trough 44*a* being removed to allow the fin wall 38*a* to be shown bowed outwardly sufficiently to illustrate this feature.

Another feature of this heat exchanger construction is that it provides sufficient flexibility for thermal expansion of the chips, both transversely and longitudinally of the stacks, transversely by means of the hollow fin walls and longitudinally by means of the spring leaf 50 at the end of each stack. Thus it is seen that regardless of the different coefficients of expansion between the various elements of the assembly, the heat exchanger will allow for it without undue pressure on the backplanes forming the housing walls.

So that the module, as now assembled, may be adapted for plug-in connection to associated apparatus, as shown in applicant's above-identified application, Serial No. 862,596, certain of the conductors 70 on the exterior walls of the housing terminate on one end wall 75 of the housing, the lower right hand end as shown in FIG. 1, where they are interconnected with terminal pins 76 projecting from the end wall.

Figure 8:
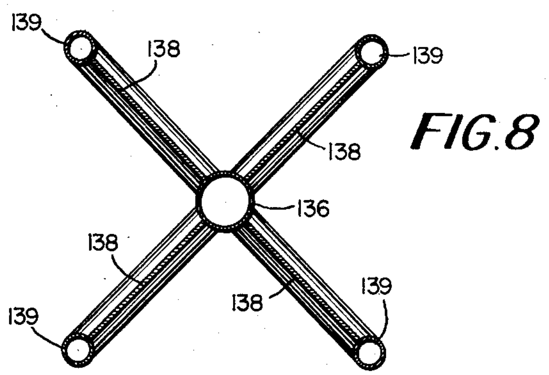
FIG. 8 is a transverse sectional view of a modified form of heat exchanger.
Figure 9:
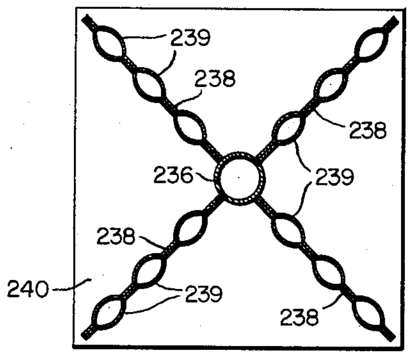
FIG. 9 is a transverse sectional view of another modified form of heat exchanger.

While the above describes the preferred form of the present invention, it should be understood that certain modifications may be made without departing from the spirit of the invention. For example, the heat exchanger may be modified in many ways, two of which are illustrated in FIGS. 8 and 9. In FIG. 8 the fins 138 are formed as single walls extending from inlet tube 136 and bounded by tubes 139 through which the cooling gas circulates. This construction provides all the advantages of the preferred form except for expansion and contraction of the fins. On the other hand the construction shown in FIG. 9 includes all of the advantages of the preferred form. Here we see that the fins 238 are of double walled construction with aligned ducts 239 running therethrough parallel to the inlet tube 236 and between plenum chambers 240 at each end, only one of which is shown. If desired, the side edges of the chip may be complementary shaped to fit snugly around the ducts 239.

From the above it is seen that the present invention provides an improved modular electrical network assembly of miniature size completely fulfilling the needs of the industry for a miniaturized electronic system providing a complex network of electronic circuit sub-assemblies—or chips—in a minimum of area, yet providing for rapid assembly, easy interconnection of the components, and rapid removal of the heat generated by the assembly when energized, the last being provided by the excellent heat conduction afforded by the tightly packed assembly resulting from the urging of the chips tightly together by the spring leaves at the ends of the stacks, and the pressure action of the heat exchanger.

I claim:

1. A modular electrical network assembly comprising: a heat exchanger, said heat exchanger including an elongated tubelike member as an inlet for a cooling fluid, a plurality of fins extending radially from and axially along said tubelike member and substantially throughout its length, said fins defining a plurality of troughs radially disposed around said tube, and outlet means in heat exchange relation with said fins for conducting said fluid from said heat exchanger; a plurality of circuit sub-assemblies stacked in face to face relation with each other, a stack of said sub-assemblies being positioned within each of said troughs with surface portions of each sub-assembly in heat exchange relation with said fins; a housing formed by wall members of electrically insulating material; and electrical conductors on said walls; each of said sub-assemblies having one or more terminals in electrically conductive contact with selected ones of said conductors on an associated housing wall.

2. A modular electrical network assembly comprising: a heat exchanger, said heat exchanger including an elongated tubelike member as an inlet for a cooling fluid, a plurality of hollow fins extending radially from and axially along said tubelike member and substantially throughout its length as outlets for said cooling fluid, said fins defining a plurality of troughs radially disposed around said tube; a plurality of circuit sub-assemblies stacked in face to face relation with each other, a stack of said sub-assemblies being positioned within each of said troughs with surface portions of each sub-assembly in heat exchange relation with said fins; a housing formed by wall members of electrical insulating material and enclosing said heat exchanger and said sub-assemblies; and electrical conductors on certain of said walls; each of said sub-assemblies having one or more terminals in electrically conductive contact with selected ones of said conductors on an associated housing wall.

3. A modular electrical network assembly comprising: a heat exchanger, said heat exchanger including an elongated tube as an inlet for a cooling fluid, a radially extending chamber surrounding said tube adjacent one end thereof, another such chamber at the other end of said tube and in open communication therewith, a plurality of hollow fins extending radially from and axially along said tubelike member and substantially throughout its length with their ends in open communication with said chambers as outlets for said fluid, said fins and said chambers defining a plurality of elongated troughs radially disposed around said tube; a plurality of circuit sub-assemblies stacked in face to face relation with each other and with a stack positioned within each of said troughs with surface portions of each sub-assembly in heat exchange relation with said fins; a housing formed by wall members of electrical insulating material and enclosing said heat exchanger and said sub-assemblies; and electrical conductors on certain of said walls; each of said sub-assemblies having one or more terminals electrically connected with selected ones of said conductors on an associated housing wall.

4. A modular electrical network assembly comprising: a heat exchanger, said heat exchanger including an elongated tube as an inlet for a cooling fluid, a radially extending plenum chamber at each end of said tube, one of said chambers being in open communication with one end of said tube and the other of said chambers surrounding said tube as an outlet for said fluid, a plurality of thin walled hollow fins extending between said chambers and radially relative to said tube as fluid conductors from said one to the other of said chambers, said fins and chambers defining a plurality of troughs radially disposed around said tube; a plurality of wafer-like circuit sub-assemblies stacked in face to face relation with each other, a stack being positioned in each of said troughs with surface portions of each sub-assembly in heat exchange relation with said fins; a housing formed by wall members of electrical insulating material and enclosing said heat exchanger and sub-assemblies; and electrical conductors on certain of said walls; each of said sub-assemblies having one or more terminals in electrically conductive contact with selected ones of said conductors on an associated housing wall.

5. A modular electrical network assembly comprising: a heat exchanger, said heat exchanger including an elongated tube as an inlet for a cooling fluid, a radially extending plenum chamber at each end of said tube, one of said chambers being in open communication with one end of said tube and the other of said chambers surrounding said tube as an outlet for said fluid, a plurality of hollow fins extending between said chambers and radially relative to said tube as fluid conductors from said one to the other of said chambers, said fins and chambers defining a plurality of troughs radially disposed around said tube; a plurality of circuit sub-assemblies stacked in face to face relation with each other, a stack being positioned in each of said troughs with surface portions of each sub-assembly in heat exchange relation with said tube and said fins; resilient means within each trough to urge said sub-assemblies within that trough in tight face-to-face contact and against one of said chambers; a housing formed by wall members of electrical insulating material enclosing said heat exchanger and sub-assemblies; and electrical conductors on certain of said walls;

each of said sub-assemblies having one or more terminals in electrically conductive contact with selected ones of said conductors on an associated housing wall.

6. A construction according to claim 5 and wherein each of said resilient means comprises a spring leaf secured to the other of said chambers.

7. A construction according to claim 6 and further including connector means on an end wall of said housing for plugging said assembly into associated equipment; and means interconnecting said conductors and said connectors.

8. A modular electrical network assembly comprising: a heat exchanger, said heat exchanger including an elongated tube as an inlet for a cooling fluid, a plurality of fins extending radially from and axially along said tube and substantially throughout its length, said fins being surrounded on their three sides away from said tube by a duct as an outlet for said cooling fluid, said fins defining a plurality of troughs radially disposed around said tube; a plurality of circuit sub-assemblies stacked in face to face relation with each other, a stack being positioned within each of said troughs with surface portions of each sub-assembly in heat exchange relation with said fins; a housing formed by wall members of electrical insulating material enclosing said heat exchanger and sub-assemblies; and electrical conductors on certain of said walls; each of said sub-assemblies having one or more terminals in electrically conductive contact with selected ones of raid conductors on an associated housing wall.

9. A modular electrical network assembly comprising: a heat exchanger, said heat exchanger including an elongated tube as an inlet for a cooling fluid, a plenum chamber at each end of said tube, one of said chambers being in open communication with one end of said tube and the other of said chambers surrounding said tube as an outlet for said cooling fluid, a plurality of fins extending between said chambers and radially relative to said tube, each of said fins having a plurality of ducts extending thereacross the ends of which are in open communication with said chambers as fluid conductors from said one to the said other chamber, said fins and said chambers defining a plurality of troughs radially disposed around said tube; a plurality of circuit sub-assemblies stacked in face to face relation with each other, a stack being positioned in each of said troughs with surface portions in heat exchange relation with said fins; a housing formed by wall members of electrically insulating material; and electrical conductors on certain of said walls; each of said sub-assemblies having one or more terminals in electrically conductive contact with selected ones of said conductors on an associated housing wall.

References Cited in the file of this patent

UNITED STATES PATENTS

| | | |
|---|---|---|
| 2,692,961 | Fondiller | Oct. 26, 1954 |
| 2,796,559 | Feucht | June 18, 1957 |
| 2,815,472 | Jackson | Dec. 3, 1957 |
| 2,945,989 | Vogel | July 19, 1960 |